United States Patent [19]

Lombard et al.

[11] Patent Number: 4,543,116
[45] Date of Patent: Sep. 24, 1985

[54] WELDING AND FLUID TIGHTNESS PROCESS FOR THE PRODUCTION OF SENSORS

[75] Inventors: Claude Lombard, Le Chesnay; Olivier Morvan, Toulouse, both of France

[73] Assignee: Regie Nationale des Usines Renault, Boulogne Billancourt, France

[21] Appl. No.: 555,571

[22] Filed: Nov. 28, 1983

[30] Foreign Application Priority Data

Nov. 26, 1982 [FR] France ................ 82 19846

[51] Int. Cl.⁴ .................. C03B 23/20; C03B 19/02
[52] U.S. Cl. .................. 65/40; 29/582; 29/584; 65/42; 65/59.3; 65/99.2
[58] Field of Search .......... 65/59.23, 36, 40, 42, 65/59.22, 59.3, 99.1, 99.2; 29/582, 584, 588

[56] References Cited

U.S. PATENT DOCUMENTS

| | | | |
|---|---|---|---|
| 3,300,289 | 1/1967 | Long | 65/99.2 X |
| 3,622,294 | 11/1971 | Loukes et al. | 65/99.2 X |
| 3,880,633 | 4/1975 | Jordan et al. | 65/99.2 X |
| 3,899,314 | 8/1975 | Siegmund | 65/99.2 X |
| 4,079,508 | 3/1978 | Nunn | 29/580 |

FOREIGN PATENT DOCUMENTS

| | | | |
|---|---|---|---|
| 46-24917 | 7/1971 | Japan | 65/40 |
| 53-142871 | 12/1978 | Japan | 29/258 |

OTHER PUBLICATIONS

"Manufacturing Preformed Dielectric Sheets with Components", Scarafino et al., IBM Tech. Disc. Bulletin, vol. 19, No. 3, pp. 957–958, 8/1976.

*Primary Examiner*—Robert Lindsay
*Attorney, Agent, or Firm*—Oblon, Fisher, Spivak, McClelland & Maier

[57] ABSTRACT

A process for producing pressure sensors and other similar devices in which a fluid-tight bond between a sealing glass and another material is obtained under the effect of the application of heat and an electric field.

The process is characterized in that the parts to be assembled float on the surface of a molten metal bath. The bath is positioned in a chamber within which a partial vacuum prevails.

6 Claims, 4 Drawing Figures

WELDING AND FLUID TIGHTNESS PROCESS FOR THE PRODUCTION OF SENSORS

BACKGROUND OF THE INVENTION

1. Field of the Invention

This invention has as its object a process for producing pressure sensors and other similar devices in which a close bond must be obtained between a sealing glass and another material under the effect of heat. The process applies particularly to the case where an electric field of some tens of volts to some thousands of volts is applied between the glass and the other material placed a slight distance from one another to accomplish so-called electrostatic welding.

2. Description of the Prior Art

The best known case is that of glass or silicon welding, a case in which a more or less thick layer of silicon dioxide is always present on the surface of the silicon. Depending on its thickness, this layer more or less modifies the welding conditions, particularly temperature conditions.

The technology makes it possible to perform the welding in a wide temperature range without deformation of the parts being welded even at the softening temperature of the glass. The process is particularly suitable for the use of a very thin glass.

The process consists in floating the unit to be welded on a moltel metal bath, particularly of tin, under a vacuum or a low pressure of a reducing gas during the welding operation. The metal preferable is tin. Use of a tin bath for the continuous production of flat glass is well known since the development of the process by the British company PILKINTON.

SUMMARY OF THE INVENTION

The object of this invention is different from that of the prior art in that there is involved not the making of a glass but rather the accomplishment of welding under vacuum between glass and a different material, the welded parts continuing to adhere to each other after the operation. Further, in the process described below, the glass is not necessarily in direct contact with the molten metal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference character designate like or corresponding parts throughout the several views and wherein.

DETAILED DESCRIPTION OF THE PREFERRED EMBODIMENTS

Figure 1:
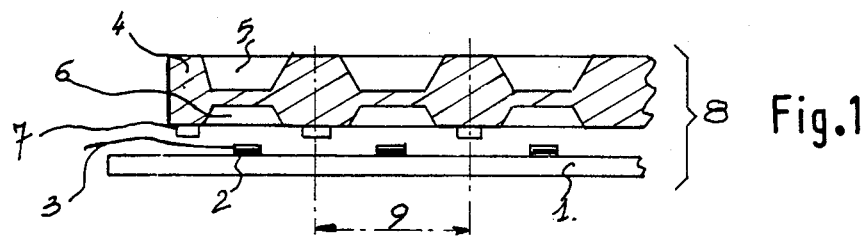
FIG. 1 is an example of the sensor parts to be assembled by electrostatic welding wherein the parts represented in section are those of a sensor having a variation in capacity, depending on ambient pressure.

The sensor parts to be assembled of FIG. 1 consist of a glass plate 1 carrying metal coatings 2 having extensions 3 projection therefrom. Opposite this plate is placed a slice of silicon 4 carrying a plurality of cavities 5, 6 and wedges 7 which can be made of silicon oxide. The group of parts to be assembled constitute a subassembly 8. After welding, each element 9 carrying a cavity of subassembly 8 will be separated from the others by sawing, diamond cutting, etc., to provide as many sensors as possible.

Unit 8, optionally covered with a flat weight 10, is placed on the surface of a tin bath 11 which is located in an enclosure 12 which, in turn, can be emptied of air by a pipe 13. A heating 15 serves to heat the tin bath to the desired temperature. A voltage source 16 is connected, on the one hand, to tin bath 11 by a first connection 17 and by a second connection 18 to an electrical connecting means between subassembly 8 and second connection 18. This means can consist of an electric contact, a soldered gold wire, an ion emitting tip, an electron gun, etc.

Enclosure 12 can be filled with a reducing gas under low pressure, for example, hydrogenated nitrogen to reduce the oxides present and avoid the creation of new ones both on the parts to be assembled and on the tin bath 11.

A direction manipulating arm 20 makes it possible, if necessary, to remove subassembly 8 from the tin bath or to pour the contents of a container 42 which contain glass onto the surface of the tin bath before adding the elements to be assembled.

Figure 3:
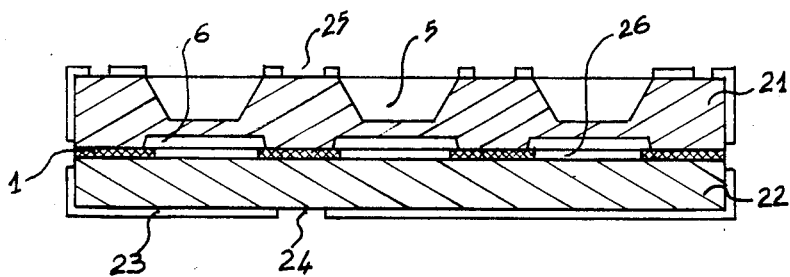
FIG. 3 illustrates parts to be assembled which differ from that of FIG. 1 in that the sealing glass is not in contact with the liquid metal and, FIG. 4 is a sectional view of a device using the process of the present invention for continuous fabrication.

FIG. 3 is an example of a second sensor in which the glass plate 1 is sandwiched between the two silicon plates 21, 22. If necessary, plates 21, 22 can be protected on the outside by a silicon oxide layer 23 in which cuts 24 and 25 are made to assure electric connections. Moreover, glass plate 1 may include cuts 26 made therein at right angles to cavities 6.

Figure 4:
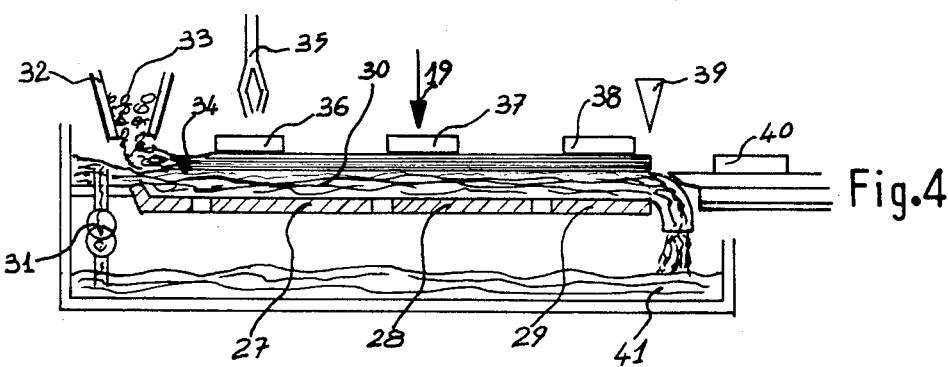

FIG. 4 is the representation of a machine making possible the continuous fabrication of sensors. A bath 30, fed by a pump 31 that can be of the electromagnetic type, flows on a slightly inclined bottom made up of three sections 27, 28 and 29 at different temperatures. A hopper 32 containing powdered glass 33 makes possible the floating of a molten glass layer 34 on the surface of the tin bath 30. A manipulator 35 serves to deposit the elements 36, 37, 38 which are to be assembled on the molten glass bath 30. A separator 39 makes it possible to isolate the glass sections carrying assembled element 40, while the tin returns to a tank 41. Electrical connecting means 19 are also provided.

Figure 2:
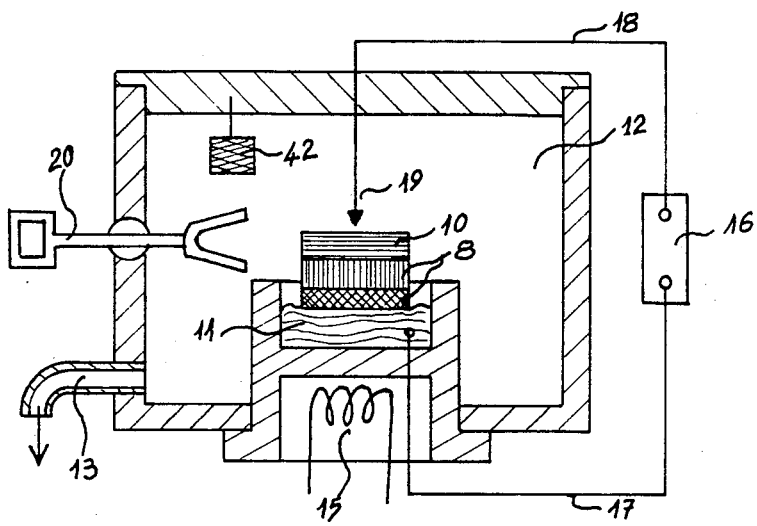
FIG. 2 is a sectional view of a device using the process, object of the invention, for batch fabrication.

The functioning of the equipment described in FIG. 2 is quite very simple in the sense that it suffices to introduce either a vacuum or a low pressure reducing gas into the enclosure to adjust the temperature of the liquid metal bath 11 to the desired temperature or temperatures, while applying the necessary voltage between the metal bath 11 and the electric connecting means 19.

The liquid metal bath serves at the same time as a perfectly horizontal flexible support, a thermal connecting means and an electrical connecting means. It allows the use of extremely thin sheets of glass and even allows for making of this sheet by means of powder or pieces deposited on tin bath 11 by manipulating arm 20. It is therefore possible to regulate the compositions of the glass according to corresponding needs and, more particularly to adjust the heat expansion factor by mixing various products in tank 42. It will also be possible to use vitrocrystalline products successfully instead of glass.

The sensor described in FIG. 3 can particularly be made in accordance with the following process. First a thin layer of glass is formed on the surface of the tin bath, followed by placement of silicon plate 22, turned over with respect to FIG. 3. Then electrostatic welding of glass 1 on 22 occurs and this is turned over followed by placing of the silicon plate in the position described in FIG. 3 with plate 21 on top.

The functioning of the equipment described in FIG. 4 is very close to that of the equipment corresponding to FIG. 2 with the successive phases of the corresponding process including making a glass sheet, placing of the element to be welded, passage the same through the temperature zones with application of the electric field, cutting the plate, and storage, all under a vacuum or low pressure.

The same equipment can also be used in a different way by replacing powdered glass 33 in hopper 32 with a roll of flat glass or even, in future technology, by replacing plates 36, 37, 38 with a strip of silicon of the type of those tested for photovoltaic cells.

The same tin or molten metal bath can be used for welding sensors in which the glass is not in direct contact with the tin. These sensors, for example, can be of the type described in the third example.

It will be noted that for making pressure sensors, the vacuum is obtained directly at the same time as the sealing.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for sealing a silicon layer to at least a face of a layer of the vitrocrystalline material, which comprises:
   stacking the silicon layer and the vitrocrystalline material layer together on the surface of a liquid metal bath so that a lower layer of said layers floats on a surface of said bath;
   placing said bath and said layers within an enclosure;
   heating said metal bath;
   reducing the pressure within said enclosure; and
   establishing a direct-current voltage between said metal bath and an upper layer of said layers so as to form an electrostatic seal between the layers.

2. A process according to claim 1, wherein the lower layer in contact with the liquid metal bath further comprises said vitrocrystalline material layer.

3. A process according to claim 2, which further comprises:
   turning said layers after forming said electrostatic seal so that said silicon layer floats on said surface of said metal bath;
   depositing a second silicon layer on an outer face of said vitrocrystalline material layer; and
   establishing a direct-current voltage between said metal bath and said second silicon layer.

4. A process according to claim 1, which further comprises filling said enclosure with a reducing gas prior to establishing said direct-current voltage.

5. A process according to claim 2, wherein said vitrocrystalline material layer further comprises a powder directly applied on said surface of said metal bath.

6. A process according to claim 1, wherein said vitrocrystalline material further comprises glass.

* * * * *